(12) United States Patent
Isobe et al.

(10) Patent No.: US 10,189,129 B2
(45) Date of Patent: Jan. 29, 2019

(54) TOOL REPLACEMENT APPARATUS

(71) Applicant: FANUC Corporation, Yamanashi (JP)

(72) Inventors: Gaku Isobe, Yamanashi (JP); Yuuzou Inaguchi, Yamanashi (JP); Naoki Sato, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 213 days.

(21) Appl. No.: 15/270,033

(22) Filed: Sep. 20, 2016

(65) Prior Publication Data

US 2017/0087678 A1 Mar. 30, 2017

(30) Foreign Application Priority Data

Sep. 29, 2015 (JP) .................................. 2015-190887

(51) Int. Cl.
  *B23Q 3/157* (2006.01)
  *G05B 19/29* (2006.01)
  *G05B 19/406* (2006.01)
(52) U.S. Cl.
  CPC ......... *B23Q 3/15706* (2013.01); *G05B 19/29* (2013.01); *G05B 19/406* (2013.01);
  (Continued)
(58) Field of Classification Search
  CPC . Y10T 408/37; Y10T 483/12; Y10T 483/123; Y10T 483/127; Y10T 483/11;
  (Continued)

(56) References Cited

U.S. PATENT DOCUMENTS 3,551,974 A * 1/1971 Fantoni ................. B23B 31/263
  29/26 R
3,587,360 A * 6/1971 Oxenham .......... B23Q 17/2233
  29/26 A
(Continued)

FOREIGN PATENT DOCUMENTS

CN 104115079 A 10/2014
CN 206296712 U 7/2017
(Continued)

OTHER PUBLICATIONS

Decision to Grant a Patent in JP Patent Application No. 2015-190887, dated Oct. 24, 2017, 6 pp.
(Continued)

*Primary Examiner* — Daniel Howell
(74) *Attorney, Agent, or Firm* — Hauptman Ham, LLP

(57) ABSTRACT

A tool replacement apparatus according to the present invention includes: a turning tool magazine capable of attaching or removing a tool to/from a spindle of a machine tool; a tool replacement control unit which controls operations of turning the tool magazine and attaching or removing a tool to/from a spindle; and a setting unit which sets a rotatable range of the tool magazine. The tool replacement control unit includes: a determining unit which determines whether or not a designated rotation angle in an instruction for turning the tool magazine is within the rotatable range set by the setting unit; and a unit which stops an operation of replacing a tool when the determining unit determines that a designated rotation angle is out of a rotatable range.

8 Claims, 9 Drawing Sheets

(52) U.S. Cl.
CPC ... *G05B 2219/50204* (2013.01); *Y10T 408/37* (2015.01); *Y10T 483/127* (2015.01); *Y10T 483/13* (2015.01); *Y10T 483/1795* (2015.01)

(58) Field of Classification Search
CPC . Y10T 483/13; Y10T 483/14; Y10T 483/136; Y10T 483/138; Y10T 483/1745; Y10T 483/179; Y10T 483/1793; Y10T 483/1795; B23Q 3/15706; B23Q 3/16; B23Q 2039/004; G05B 19/4061; G05B 2219/50204
USPC ......................................... 700/177, 178, 179
See application file for complete search history.

(56) References Cited

U.S. PATENT DOCUMENTS

| | | | | |
|---|---|---|---|---|
| 3,635,569 | A * | 1/1972 | Sato | B23Q 3/15706 408/35 |
| 3,830,584 | A * | 8/1974 | Ohlig | B23B 31/263 29/40 |
| 4,090,281 | A * | 5/1978 | Hautau | B23B 39/205 29/40 |
| 4,117,586 | A | 10/1978 | Uchida et al. | |
| 4,396,974 | A * | 8/1983 | Imazeki | G05B 19/056 483/1 |
| 4,574,464 | A * | 3/1986 | Lodetti | B23H 7/26 408/35 |
| 5,730,691 | A * | 3/1998 | Tokura | B23Q 1/0018 29/40 |
| 8,202,206 | B2 * | 6/2012 | Feinauer | B23Q 3/155 483/1 |
| 2015/0134105 | A1 | 5/2015 | Iuchi et al. | |
| 2015/0367466 | A1 * | 12/2015 | Isobe | B23Q 3/15706 483/5 |

FOREIGN PATENT DOCUMENTS

| | | |
|---|---|---|
| JP | 61-50735 A | 3/1986 |
| JP | 2-284847 A | 11/1990 |
| JP | 04-101742 A | 4/1992 |
| JP | 4-107124 A | 4/1992 |
| JP | H05228767 A | 9/1993 |
| JP | 5-74738 U | 10/1993 |
| JP | H08118181 A | 5/1996 |
| JP | 2013-71203 A | 4/2013 |
| JP | 2013205975 A | 10/2013 |

OTHER PUBLICATIONS

Office Action in Chinese Application No. 201610868464.3, dated Jul. 4, 2018, 14 pp.

* cited by examiner

FIG.7A CASE OF TURNING IN NORMAL DIRECTION
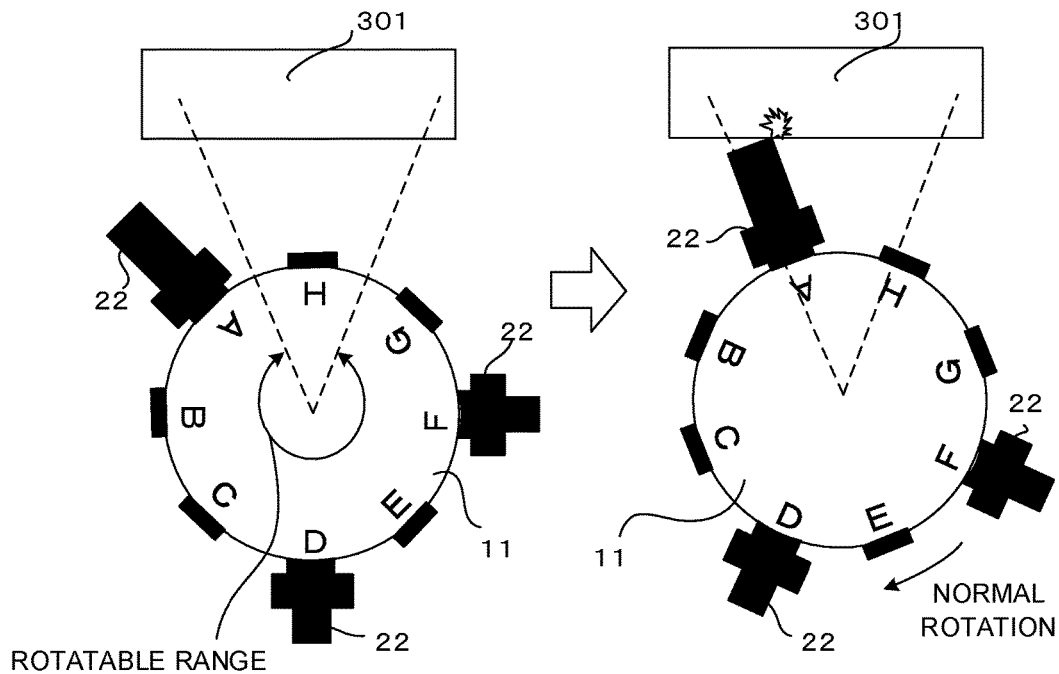
FIG.7B CASE OF TURNING IN REVERSE DIRECTION
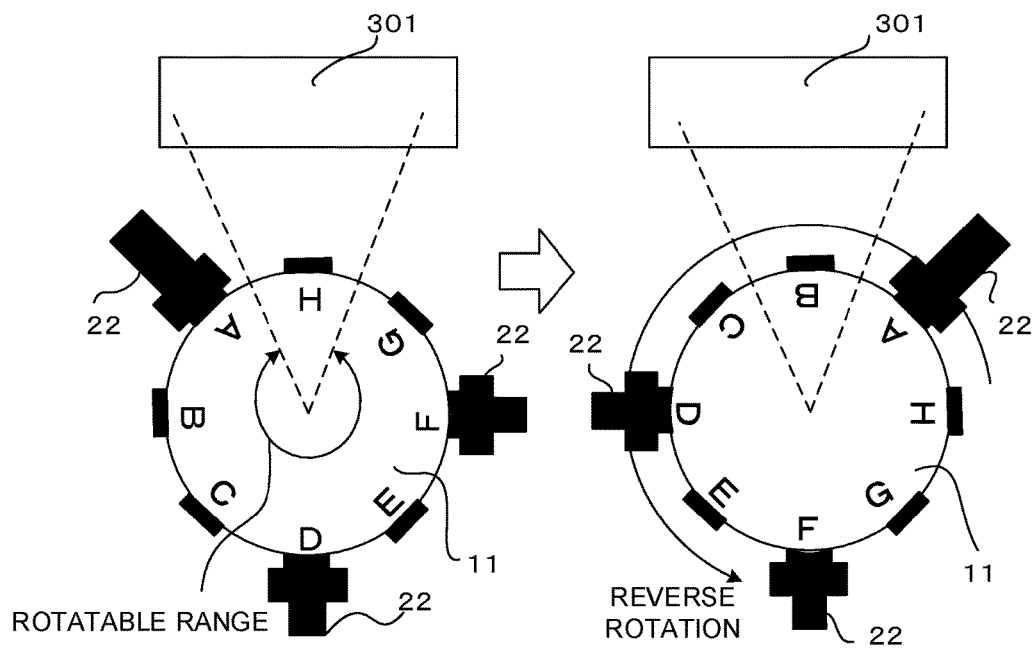

| TOOL LENGTH | INTERFERENCE RANGE |
|---|---|
| NOT GREATER THAN 100 mm | NO |
| 100~200mm | -160 DEGREES TO 160 DEGREES |
| 200~250mm | -145 DEGREES TO 145 DEGREES |

INTERFERENCE RANGE DATA

TOOL REPLACEMENT APPARATUS

RELATED APPLICATIONS

The present application claims priority to Japanese Patent Application Number JP2015-190887, filed Sep. 29, 2015, the disclosure of which is hereby incorporated by reference herein in its entirety.

BACKGROUND OF THE INVENTION

1. Field of the Invention

The present invention relates to a tool replacement apparatus for a machine tool, which includes a turning tool magazine holding a plurality of tools.

2. Description of the Related Art

In a tool replacement apparatus including a turning tool magazine, a plurality of tool gripping parts (tool pots) are provided on a circumferential surface of the tool magazine, and it is designed such that a tool is held by each of the tool gripping parts, a position where a tool is to be housed is indexed by turning the tool magazine, and a tool can be attached to, and be removed from, a spindle of a machine tool.

For take-out of a tool from a tool magazine or a like operation, various ways to prevent a tool being taken out from interfering with another member are developed (refer to JP 05-228767 A and JP 2013-205975 A).

Also, JP 8-118181 A discloses a tool replacement apparatus in which a tool magazine is tilted with respect to an axis of a spindle, to thereby minimize occurrence of interference between a tool housed in the tool magazine and another member while the tool magazine is turning.

A tool magazine, in which various tools are to be housed, turns in indexing a tool, and so, there is a danger if a housed tool interferes with another member while the tool magazine is turning. Thus, it is necessary to prevent a housed tool from interfering with other members such as a component of a machine tool and a jig while a tool magazine is turning. In a conventional tool replacement apparatus, there is imposed limitation to a length and a shape of a tool which is to be housed in a tool magazine so that interference with another member cannot be caused in any phase in 360 degrees while the tool magazine is turning.

However, it is undesirable to impose limitation to a tool which can be housed in a tool magazine because also a processing function of a machine tool is limited.

SUMMARY OF THE INVENTION

In view of the foregoing matters, an object of the present invention is to provide a tool replacement apparatus which can be safely used by preventing a housed tool from interfering with another member without imposing any limitation to a tool which is to be housed in a tool magazine.

A tool replacement apparatus for a machine tool according an embodiment of to the present invention includes: a turning tool magazine capable of attaching or removing a tool to/from a spindle of a machine tool; a tool replacement control unit which controls operations of turning the tool magazine and attaching or removing a tool to/from a spindle; and a setting unit which sets a rotatable range of the tool magazine, the tool replacement control unit including: a determining unit which determines whether or not a designated rotation angle in an instruction for turning a tool magazine is within the rotatable range set by the setting unit; and a unit which stops an operation of replacing a tool when the determining unit determines that a designated rotation angle is out of a rotatable range.

Also, when the determining unit determines that a designated rotation angle is out of a rotatable range, the tool replacement control unit outputs an instruction for temporally stopping an operation of the machine tool, to a control device which controls the machine tool.

Also, the rotatable range of a tool magazine which is set by the setting unit is set as an upper limit angle to which a tool magazine is rotated in a normal direction and a lower limit angle to which a tool magazine is rotated in a reverse direction, the determining unit also determines a turnable direction, and the tool replacement control unit rotates the tool magazine in the turnable direction which is determined by the determining unit, and turns the tool magazine to a designated rotation angle which is designated in an instruction for turning a tool magazine.

The tool replacement control unit and the setting unit are provided in the control device which controls a machine tool, so that the control device which controls a machine tool is also used as the tool replacement control unit.

In addition, the control device which controls a machine tool prefetches a processing program of a machine tool, the determining unit determines whether or not a designated rotation angle is within a rotatable range based on an instruction for turning a tool magazine which is obtained by prefetching, and an instruction for temporally stopping an operation of the machine tool is output to the control device which controls a machine tool when it is determined that a designated rotation angle is out of a rotatable range.

Also, the control device which controls a machine tool includes a program checking unit which checks a processing program, the determining unit determines whether or not a designated rotation angle in an instruction for turning a tool magazine is within a rotatable range while the program checking unit is making a program check, and a display unit of the control device which controls a machine tool indicates that an instruction for turning out of a rotatable range is provided when it is determined that a designated rotation angle is out of a rotatable range.

Instead of using the setting unit which sets a rotatable range of a tool magazine, the tool replacement control unit includes the data storing unit which stores data about an interference region or a rotatable range of a tool magazine which corresponds to data about a tool length of a tool, and a unit which calculates and sets a rotatable range of a tool magazine from a tool length of a tool attached to a tool magazine, based on the data stored in the data storing unit.

Also, the tool replacement apparatus according to the present invention further includes a display unit. When the determining unit determines that a designated rotation angle is out of a rotatable range, the tool replacement control unit informs a user accordingly with the use of the display unit.

According to the present invention, a tool having a length or a shape which cannot conventionally be used for fear of interference with another member while a tool magazine is turning, can be safely used because interference is prevented from occurring by limiting a rotatable range of the tool magazine.

BRIEF DESCRIPTION OF THE DRAWINGS

The above-described and other objects and features of the present invention will be clarified from the following description of preferred embodiments with reference to accompanying drawings. Out of those drawings:

FIGS. 7A and 7B are views for explaining a rotation direction of a tool magazine and occurrence of interference;

DETAILED DESCRIPTION OF THE PREFERRED EMBODIMENTS

Hereinafter, preferred embodiments of the present invention will be described with reference to the drawings.

Figure 1:
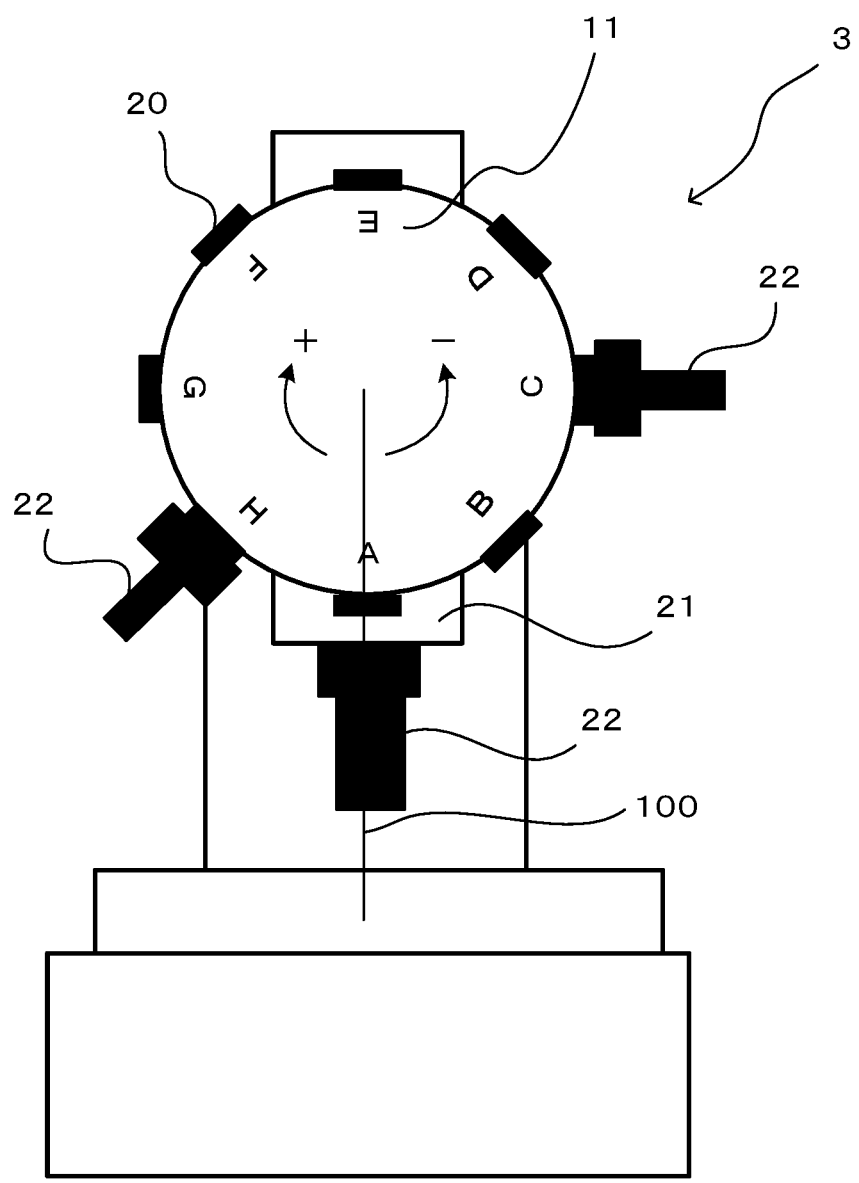
FIG. 1 is a schematic view of a machine tool including a tool replacement apparatus which includes a turning tool magazine, according to one preferred embodiment of the present invention.
Figure 2:
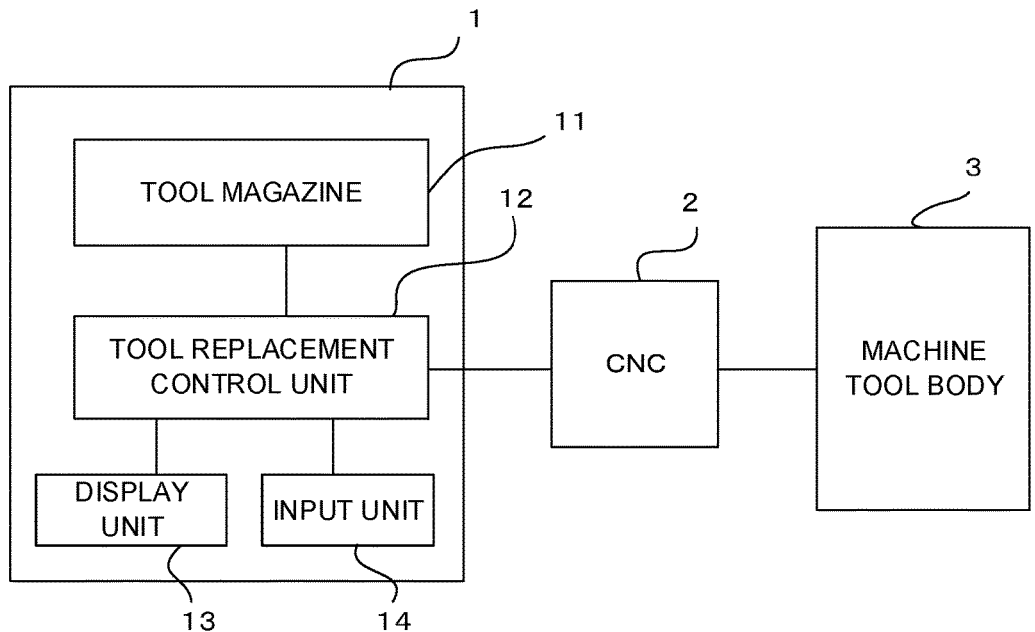
FIG. 2 is a schematic view of a control system which controls the machine tool and the tool replacement apparatus according to the one preferred embodiment.

FIG. 1 is a schematic view of a machine tool including a tool replacement apparatus which includes a turning tool magazine according to the present preferred embodiment. Also, FIG. 2 is a schematic view of a control system which controls the machine tool and the tool replacement apparatus. The tool replacement apparatus 1 includes: a tool magazine 11; a tool replacement control unit 12 which includes a processor for diving and controlling the tool magazine 11, a memory, and the like; a display unit 13 formed of a liquid crystal, a CRT, or the like which is connected to the tool replacement control unit 12; and an input unit 14 including a keyboard or the like for inputting various set values. The tool replacement control unit 12 is connected to a control device 2 which controls a machine tool body 3. According to the present preferred embodiment, a computer numerical controller (CNC) is used as the control device. A CNC 2 controls the machine tool body 3 with a processing program or the like, and processes a material being worked on. Also, when an instruction for replacement of a tool is read out from the processing program or the like, the CNC 2 gives the instruction to the tool replacement control unit 12 of the tool replacement apparatus 1.

The tool replacement control unit 12 drives and controls the tool magazine 11 in response to the instruction for replacement of a tool, and controls delivery of a tool between respective spindles of the tool magazine 11 and a machine tool.

The tool magazine 11 includes a plurality of tool gripping parts on a circumference thereof. According to the present preferred embodiment, the tool magazine 11 includes eight tool gripping parts which are arranged at intervals of 45 degrees which is a rotation angle and are respectively denoted by reference signs A to H. Each of the tool gripping parts A to H includes a tool gripping unit 20, and holds various tools 22. FIG. 1 shows an example in which the tools 22 are housed in the tool gripping parts C and H, and the tool 22 which was housed in the tool gripping part A is being attached to a spindle 21 of the machine tool body 3. The memory of the tool replacement control unit 12 stores a rotation angle of a tool magazine with respect to a certain phase, which is used for indexing a tool gripping part at a time of replacement of a tool. Such a phase angle will be referred to as an angle of each of the tool gripping parts A to H in the present preferred embodiment. Also, a position of a center axis of the spindle 21 is set as a reference position 100, and as shown in FIG. 1, a state in which the tool gripping part A is placed in the reference position 100 is regarded as an origin "0" of a phase angle of the tool magazine 11. The tool magazine 11 can rotate in a normal direction and a reverse direction, and it is assumed that clockwise rotation is normal (+) rotation and counter-clockwise rotation is reverse (−) rotation in FIG. 1.

An angle of each of the tool gripping parts A to H is an angle through which each of the tool gripping parts travels from a state where an origin of a phase angle of a tool magazine (i.e., a position of the tool gripping part A) is placed in the reference position 100 (a state shown in FIG. 1) to a state where each of the tool gripping parts is placed in the reference position. Thus, an angle of the tool gripping part A is zero degree, and an angle of the tool gripping part B is 45 degrees because the tool gripping part B is placed in the reference position 100 when the tool magazine 11 is rotated through 45 degrees in a normal direction. Likewise, an angle of the tool gripping part C is 90 degrees because the tool gripping part C is placed in the reference position 100 when the tool magazine 11 is rotated through 90 degrees in a normal direction. Further, an angle of the tool gripping part H is −45 degrees because the tool gripping part H is placed in the reference position 100 when the tool magazine 11 is rotated through 45 degrees in a reverse (−) direction. Respective angles of the tool gripping parts A to H are as follows. Also, the following angle data of the tool gripping parts A to H is registered in the memory of the tool replacement control unit.

Tool gripping part A . . . 0 degree
Tool gripping part B . . . +45 degrees
Tool gripping part C . . . +90 degrees
Tool gripping part D . . . +135 degrees
Tool gripping part E . . . ±180 degrees
Tool gripping part F . . . −135 degrees
Tool gripping part G . . . −90 degrees
Tool gripping part H . . . −45 degrees As a result of an instruction for replacement of a tool being given to the tool replacement apparatus 1 from the CNC 2, the tool replacement control unit 12 delivers the tool 22 mounted on the spindle 21, to the tool gripping unit 20 of the tool magazine 11, and reads angle data of one of tool gripping parts which holds a tool which is to be used next. Then, the tool replacement control unit 12 rotates the tool magazine 11 through degrees from an angle of a tool gripping part which is indexed before replacement, to an angle in the read angle data of the tool gripping part, to index the tool gripping part which holds the tool which is to be used, to a position of a spindle (the reference position). Thereafter, the tool 22 which is to be used is delivered from the tool gripping part to the spindle 21.

For example, in a case where a tool held by the tool gripping part C is replaced with a tool held by the tool gripping part E, since an angle of the tool gripping part C is +90 degrees and an angle of the tool gripping part E is +180 degrees, the tool replacement control unit 12 rotates the tool magazine 11 through 90 degrees which is a moving rotation angle, in a normal direction, from a 90-degree angle (a state in which the tool gripping part C is present in the reference position and a rotation angle of the tool magazine is 90 degrees) to a 180-degree angle. Then, the tool gripping part E is indexed to a position of a spindle (the reference position), and the tool 22 is delivered from the tool gripping part E to the spindle 21.

Figure 3A:
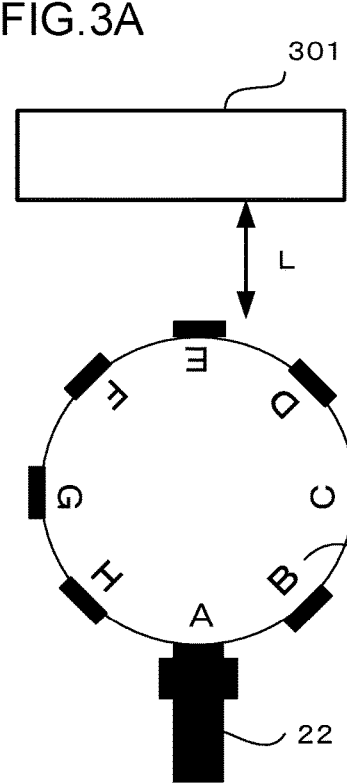
FIGS. 3A and 3B are views for explaining occurrence of interference.
Figure 3B:
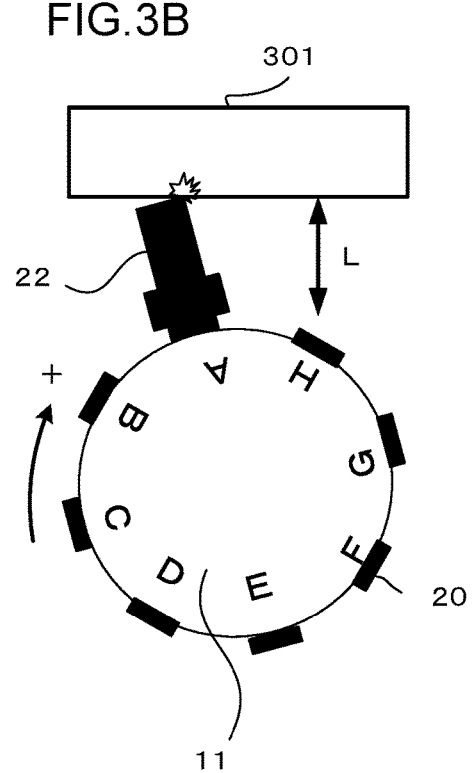

On the other hand, while the tool magazine 11 is turning, the tool 22 housed in the tool magazine 11 and a part of a machine tool come into contact with each other, to cause interference in some cases. As shown in FIGS. 3A and 3B, in a case where a distance between the tool gripping unit 20 of the tool magazine 11 and a part 301 of the machine tool body 3 is L, if the tool 22 having a tool length greater than L is housed in the tool magazine 11, the tool 22 comes into contact with the part 301 of the machine tool, so that interference between the tool and the machine tool occurs as shown in FIG. 3B. Thus, conventionally, the use of a tool is restricted, and only a tool having a tool length not greater than L can be used.

In view of the foregoing matters, according to the present invention, even in a case where a tool housed in a tool magazine is likely to interfere with another member because of a tool length or a shape thereof, the tool can be used by virtue of a structure of a machine tool, placement of a tool magazine, and the like.

According to the present preferred embodiment, a rotatable range of the tool magazine 11 is set, and the tool magazine 11 is rotated within a rotatable range as set. For setting a rotatable range, a user of a machine tool previously checks in which phase the tool magazine 11 is present when interference of the tool occurs, and a rotatable range is set by the input unit 14 with the use of parameters P1 to Pn, based on the user's check. Then, a rotatable range as set is stored in the memory of the tool replacement control unit 12. According to the present preferred embodiment, the input unit 14 and the memory form a setting unit which sets a rotatable range.

Figure 4:
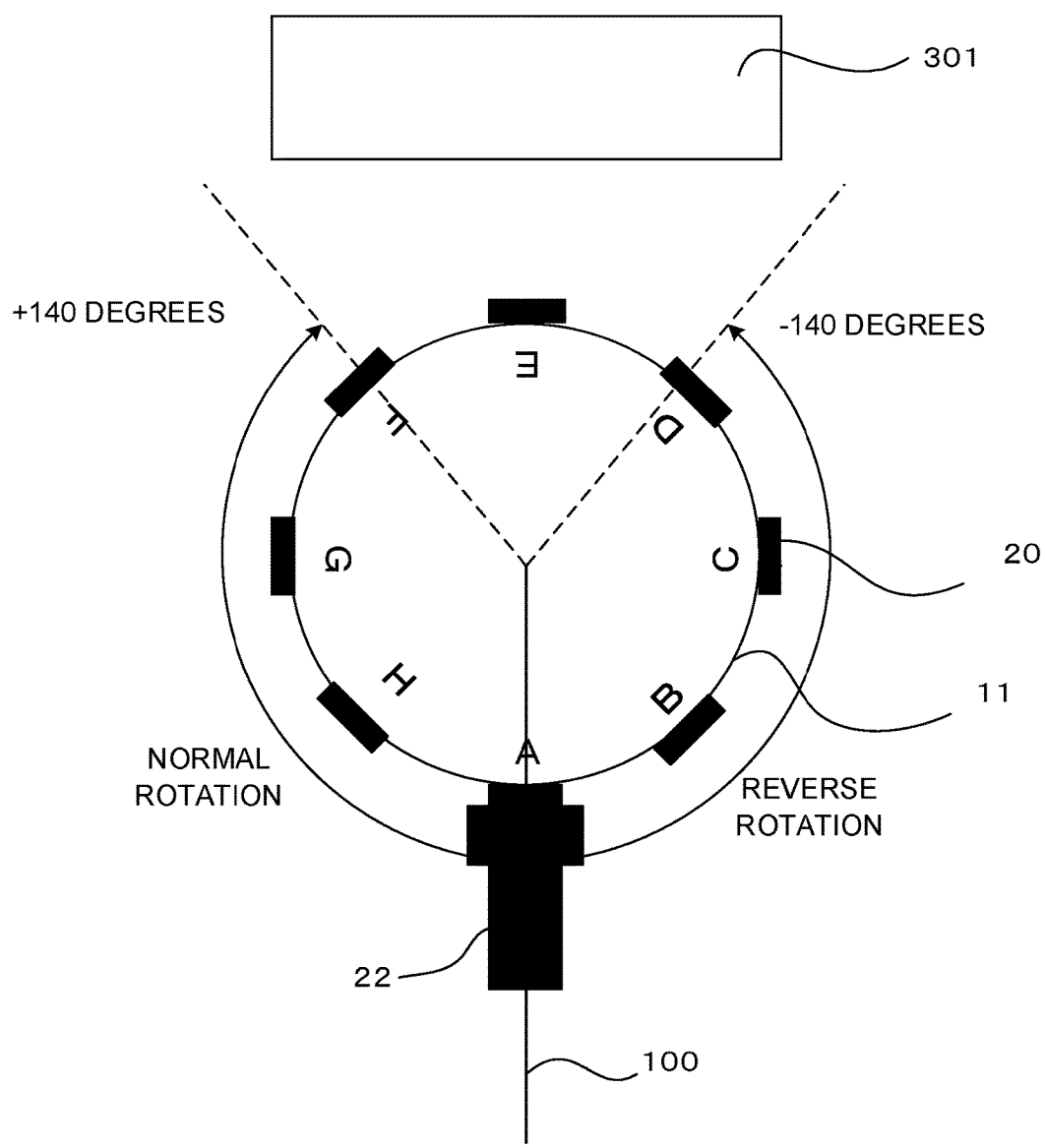
FIG. 4 is a view for explaining setting of a rotatable range of a tool magazine.

In a setting method with the use of the parameters P1 to Pn, a lower limit and an upper limit of a phase of the tool magazine 11, a center angle and a width between angles of a rotatable range, and the like, are used. For example, as shown in FIG. 4, in a case where a rotatable range is required to be set at a range of −140 degrees to +140 degrees with respect to a reference phase of a tool magazine, a lower limit of −140 and an upper limit of +140 are set as parameters. In this regard, since angles from 0 to 180 degrees=−180 degrees to 0 degree are set in the tool magazine 11, if exceeding 180 degrees, an angle of the same degrees with a revere sign is used.

Figure 5:
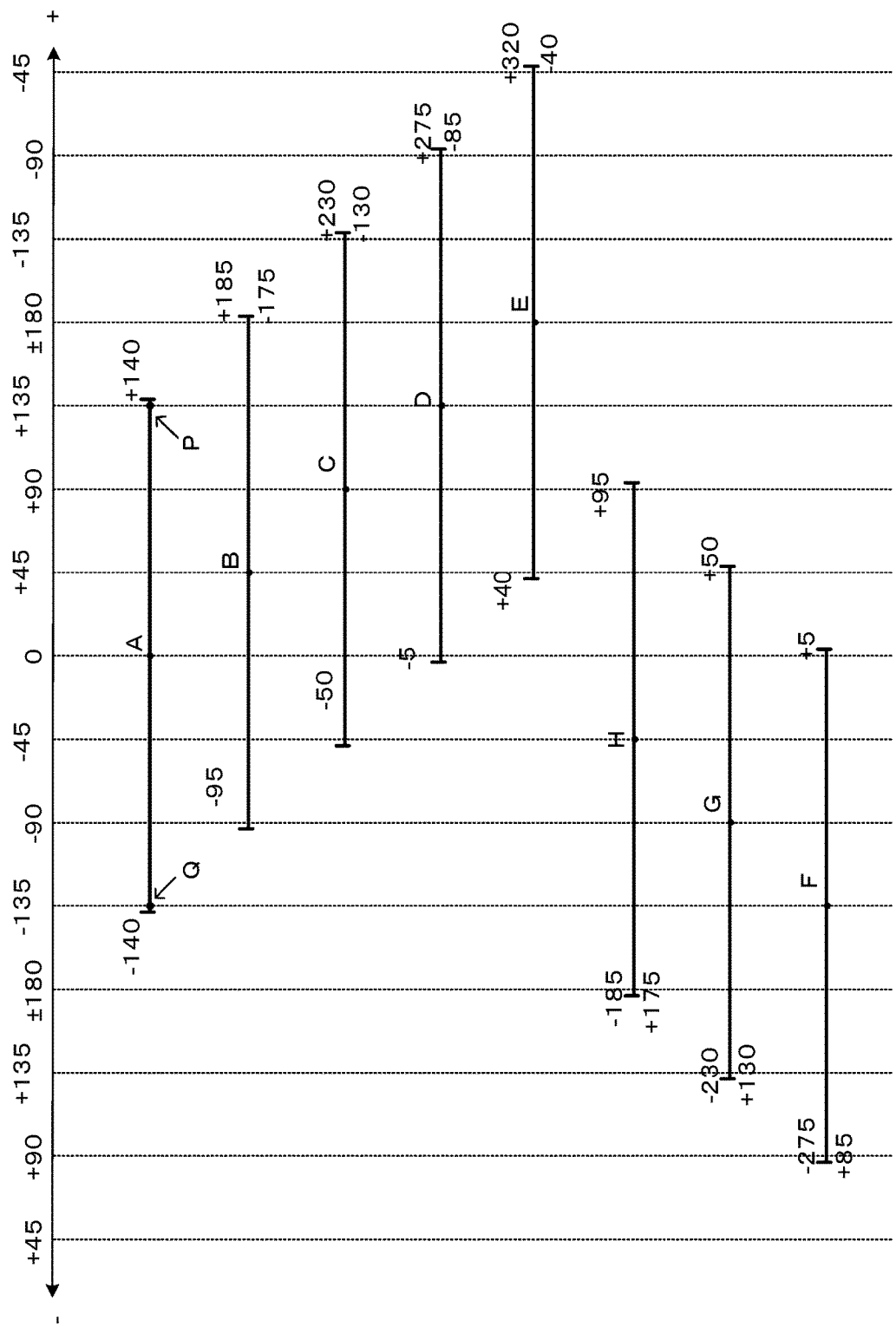
FIG. 5 is a view for explaining a rotatable range in a case where a tool which causes interference is housed in each of tool gripping parts according to the one preferred embodiment.

FIG. 5 is a view for explaining a rotatable range in a case where the tool 22 which has an interference range (a rotation forbidden range) between a position of 40 degrees ahead of a center line and a position of 40 degrees behind a center line as shown in FIG. 4, is housed in one of the tool gripping parts A to H. Rotatable ranges are as follows. It is noted that parenthesized terms in the following description will denote interference ranges.

A: −140 to 0 to +140 degrees (+140 to +180=−180 to −140 degrees)

B: −95 to 0 to +180 degrees=−180 to −175 degrees (−175 to −95 degrees)

C: −50 to 0 to +180 degrees=−180 to −130 degrees (−130 to −50 degrees)

D: −5 to 0 to +180 degrees=−180 to −85 degrees (−85 to −5 degrees)

E: +40 to +180 degrees=−180 to −40 degrees (−40 to 0 to +40 degrees)

F: +85 to +185 degrees=−180 to 0 to +5 degrees (+5 to +85 degrees)

G: +130 to +180 degrees=−180 to 0 to +50 degrees (+50 to +130 degrees)

H: +175 to +180 degrees=−180 to 0 to +95 degrees (+95 to +175 degrees)

Description will be made by taking a case where the tool 22 is housed in the tool gripping part C as an example. While the tool gripping part C is present in the reference position 100, a phase of the tool magazine 11 is +90 degrees, so that the tool magazine 11 is rotatable from a 90-degree angle through +140 degrees in a normal direction and through −140 degrees in a reverse direction. Accordingly, when the tool magazine 11 is rotated in a reverse direction to detect a lower limit, 90−140=−50 degrees is detected. On the other hand, when the tool magazine 11 is rotated in a normal direction to detect an upper limit, though 90+140=230 degrees, −130 degrees (230−360=−130) is detected as a detection value. That is, when the tool magazine 11 is rotated in a normal direction and a negative rotation angle is detected, it means exceeding 180 degrees. In this case, a rotatable range is a range including 180 degrees, and has a lower limit of −50 degrees and an upper limit of −130 degrees. As a result of −50 to 0, 0 to +180=−180 to −130, a rotatable range is −50 to −130 degrees as shown in FIG. 5.

Figure 6:
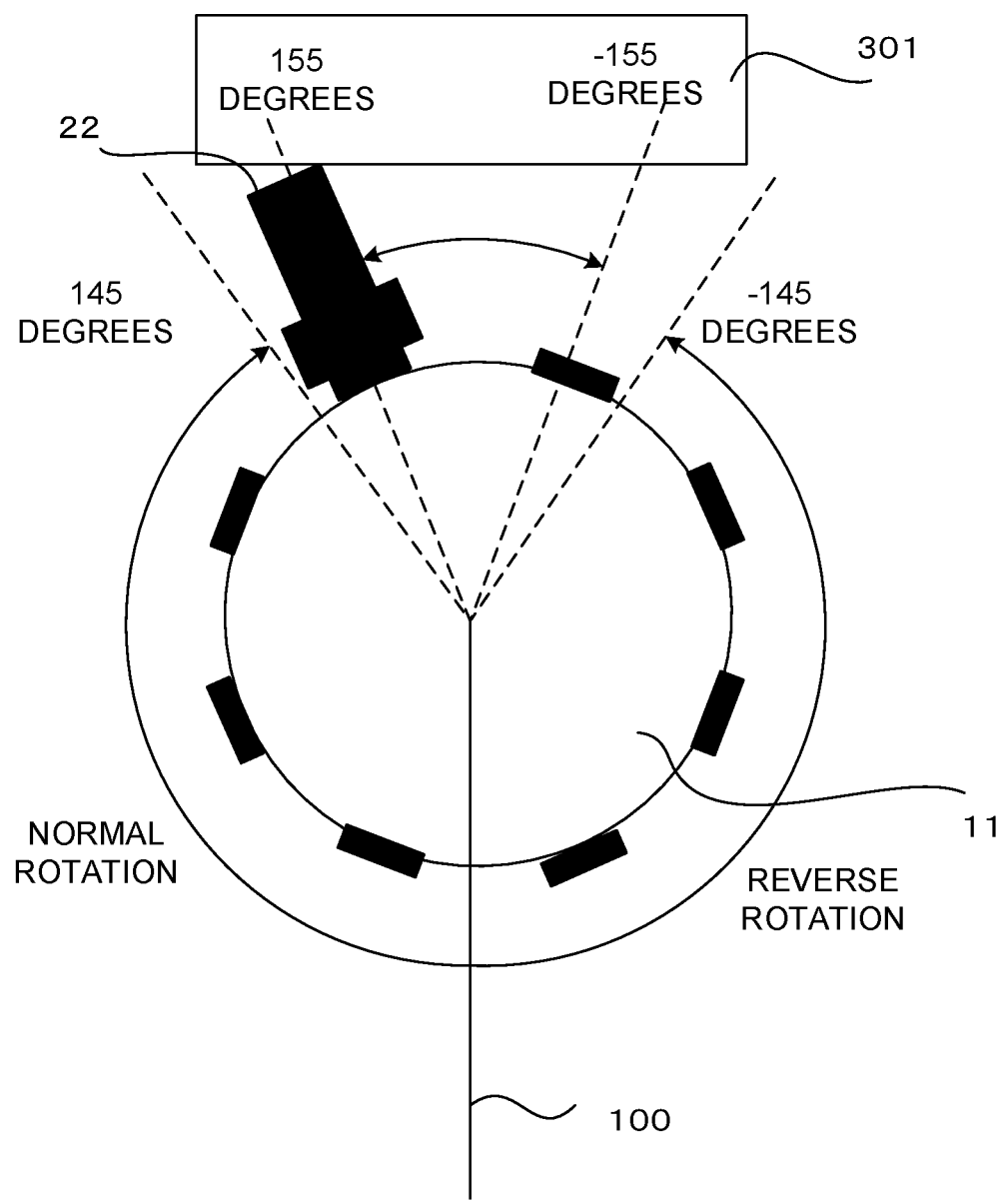
FIG. 6 is a view for explaining setting of a rotatable range with some margins being left.

Also, a rotatable range is set with some margins being left. As shown in FIG. 6, in a case where a tool interferes with another member when a phase of the tool magazine 11 is in a range of −155 to −180 degrees, or +155 degrees to +180 degrees, a lower limit and an upper limit of a rotatable range are set at −145 degrees and +145 degrees, respectively, taking into account some margins.

In a case where a plurality of tools which are likely to interfere with a part of a machine are housed in the tool magazine 11, the largest region in a common rotatable range (the largest region in a range excluding an interference range) is set as a rotatable range. For example, in a case where tools each of which has a rotatable range of −140 degrees to +140 degrees when housed in the tool gripping part A as shown in FIG. 4, are housed in the tool gripping parts A and C, a lower limit and an upper limit of a rotatable range for the tool held by the tool gripping part A are −140 degrees and +140 degrees, respectively, and a lower limit and an upper limit of a rotatable range for the tool held by the tool gripping part C are −50 degrees and −130 degrees (=+230 degrees) as shown in FIG. 5. So, a lower limit and an upper limit of a common rotatable range are −50 degrees and +140 degrees, respectively.

While such a rotatable range can be set by previously measuring an upper limit and a lower limit thereof as described above on one hand, this rotatable range can also be set by setting a rotation width and a center angle of the rotation width and offsetting an angle of a tool gripping part in which a tool is housed. In this case, the tool replacement control unit 12 performs calculations in accordance with the following formulas, to obtain an upper limit and a lower limit of a rotatable range, which are then set and stored. The formulas are:

an upper limit of a rotatable range=+(a set rotation width/2)+a set center angle+an angle of a tool gripping part; and a lower limit of a rotatable range=−(a set rotation width/2)+a set center angle+an angle of a tool gripping part.

For example, in an example shown in FIG. 4, it is assumed that a center angle and a rotation width are set at 0 degree and 280 degrees, respectively. Then, since an angle of a tool gripping part is 0 degree, results are provided as follows;

an upper limit of a rotatable range=+(280/2)+0+0=+140; and a lower limit of a rotatable range=−(280/2)+0+0=−140.

Further, in a case where a tool is housed not in the tool gripping part A, but in the tool gripping part C, an angle of the tool gripping part is 90 degrees, so that an upper limit of a rotatable range is +(280/2)+0+90=+230, or +(280/2)+0+90+230=−130, and a lower limit of a rotatable range is −(280/2)+0+90=−50 (refer to FIG. 5).

Also, in a case where a center angle and a rotation width are set at 90 degrees and 280 degrees, respectively, (in a case where the part 301 of the machine tool is placed not above the tool magazine 11, but on the right of the tool magazine in FIG. 4), when a tool is housed in the tool gripping part A, results are provided as follows;

an upper limit of a rotatable range=+(280/2)+90+0=+230=−130; and a lower limit of a rotatable range=−(280/2)+90+0=−50.

In the same case, when a tool is housed in the tool gripping part G, results are provided as follows;

an upper limit of a rotatable range=+(280/2)+90−90=+140; and a lower limit of a rotatable range=−(280/2)+90−90=−140.

Additionally, contrary to the above-described way, not a rotatable range, but an interference range in which rotation is made impossible may be set. Then, a rotatable range can be obtained based on a set interference range by the tool replacement control unit 12.

In the above-described manner, an upper limit and a lower limit of a rotatable range of a tool magazine are set and stored in the memory of the tool replacement control unit.

Also, while interference between a tool mounted on a tool magazine and another member occurs or does not occurs depending on a rotation direction of the tool magazine 11. As shown in FIGS. 7A and 7B, in a case where the tool 22 which is likely to interfere with the part of 301 of the machine tool is housed in the tool gripping part A, in moving the tool gripping part F from a position thereof in a state where the tool gripping part D is present in the reference position 100 to the reference position, in order to attach a tool held by the tool gripping part F to a spindle, rotation of the tool magazine 11 in a normal direction would cause interference between the tool 22 and the part 301 of the machine tool as shown in FIG. 7A. In contrast thereto, rotation of the tool magazine 11 in a reverse direction would allow the tool gripping part F to be moved to the reference position 100 without causing interference as shown in FIG. 7B.

The foregoing matters will be specifically described with reference to the view for explaining a rotatable range in FIG. 5. When a tool causing interference is held by the tool gripping part A and a rotatable range thereof is set at a range of −140 to +140 degrees, the tool magazine 11 is present in a position of 135 degrees (a position denoted by a reference sign "P" in FIG. 5) in a state shown in FIG. 7A, and a target rotation angle of −135 degrees (a position denoted by a reference sign "Q" in FIG. 5) is included in a rotatable range. However, in an attempt to achieve rotation from a position of +135 degrees to a position of −135 degrees, the tool magazine 11 can be rotated to a position of +140 degrees at the maximum, and cannot be rotated to a position of −135 degrees (+225 degrees) when it is rotated in a normal direction. However, the tool magazine 11 can be rotated to a position of +135 degrees in a reverse (−) direction.

Figure 8:
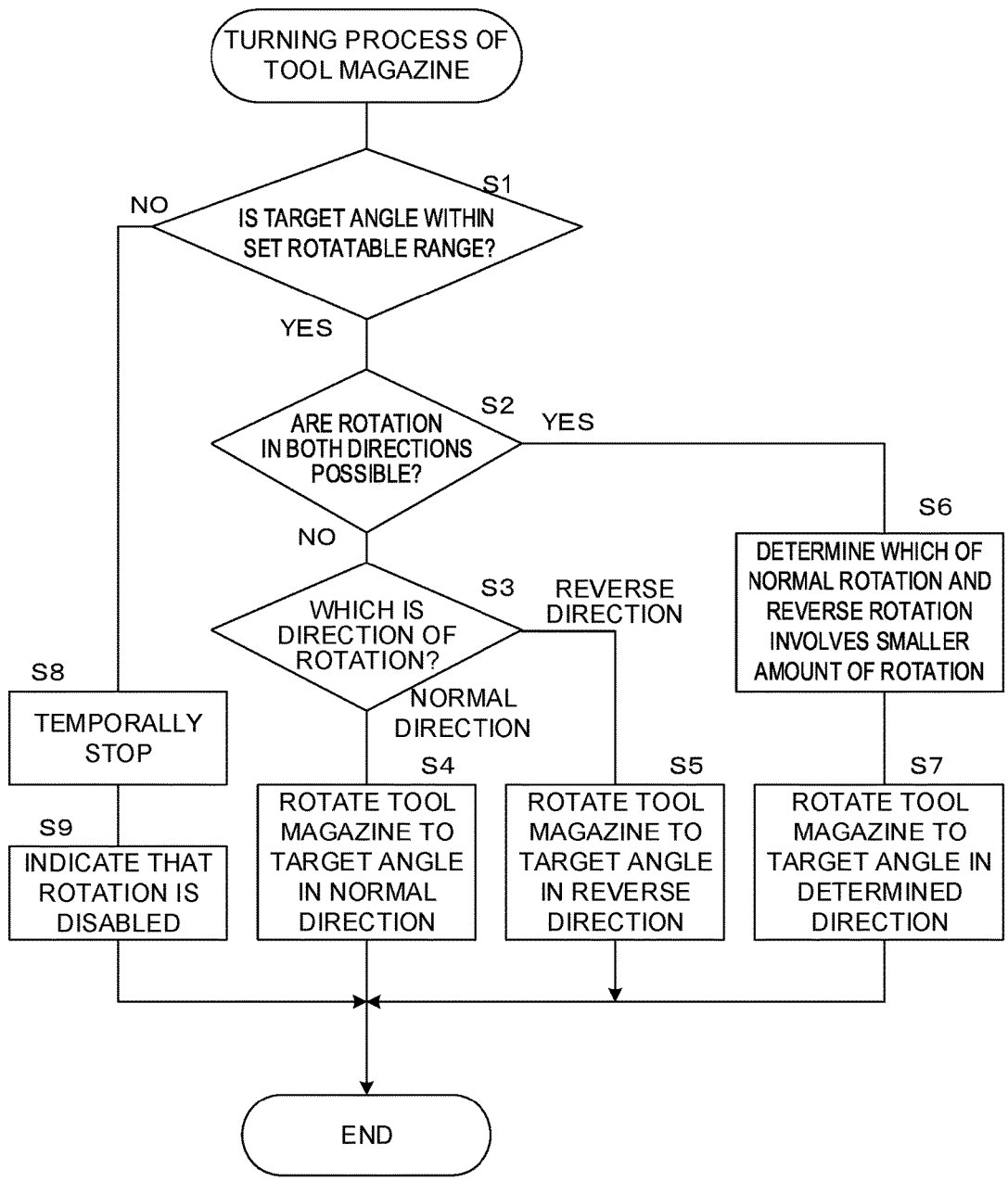
FIG. 8 is a flow chart showing an algorithm of a turning process of a tool magazine.

FIG. 8 is a flow chart showing an algorithm of a turning process of a tool magazine, which is carried out by the processor of the tool replacement control unit 12 of the tool replacement apparatus 1 according to the present preferred embodiment.

The processor of the tool replacement control unit 12 of the tool replacement apparatus 1 carries out the turning process of a tool magazine shown in FIG. 8, upon receipt of an instruction for replacement of a tool from the control device 2 of a machine tool. Determination is made as to whether or not aa target angle of a tool gripping part (tool) which is designated in the instruction for replacement of a tool is within a set rotatable range (step S1). If the target angle is not within the set rotatable range, an operation for replacement of a tool is temporally stopped. Further, an instruction for stopping an operation of a machine tool is output to the control device 2 of the machine tool (step S8). Also, the display unit 13 indicates an alarm or indicates that an instruction for rotation out of a rotatable range is provided (step S9) or the like, and the process is finished.

On the other hand, if it is determined in the step S1 that a target angle of a tool gripping part is within a set rotatable range, further determination is made as to whether a tool magazine reaches a target angle before reaching a set upper limit angle by rotation of the tool magazine in a normal direction, or a tool magazine reaches a target angle before reaching a set lower limit angle by rotation of the tool magazine in a reverse direction (step S2). Taking an instance shown in FIGS. 7A and 7B as an example, in a case where an instruction for replacing a tool with a tool held by the tool gripping part F (an angle of which is −135 degrees) is given while the tool gripping part D (an angle of which is +135 degrees) is present in the reference position (an angle denoted by a reference sign "P" in FIG. 5), a tool magazine should be moved 180 or more degrees in order to move the tool magazine from a phase angle of +135 degrees to a phase angle of −135 degrees in a normal direction. However, since a set upper limit angle of a rotatable range is 140 degrees, it is determined that rotation in a normal direction cannot be achieved. However, it is determined that by rotating the tool magazine in a reverse (−) direction, the tool magazine can reach a target angle of −135 degrees (an angle denoted by a reference sign "Q" in FIG. 5) before reaching a set lower limit angle of −140 degrees of a rotatable range.

Then, if it is determined in the step S2 that only one of rotation in a normal direction and rotation in a reverse direction can be achieved, determination is made as to which of rotation in a normal direction and rotation in a reverse direction can be achieved (step S3). If it is determined that rotation in a normal direction can be achieved, the tool magazine is rotated in a normal direction, and a tool gripping part, an angle of which is a designated target angle, is placed in the reference position 100 (step S4). Thus, the turning process of a tool magazine is finished. Also, if it is determined that rotation in a reverse direction can be achieved, the tool magazine is rotated in a reverse direction, and a tool gripping part, an angle of which is a designated target angle, is placed in the reference position 100 (step S5). Thus, the turning process of a tool magazine is finished.

Further, if it is determined in the step S2 that both of rotation in a normal direction and rotation in a reverse direction can be achieved, determination is made as to which of rotation in a normal direction and rotation in a reverse direction involves a smaller amount of rotation for a shift to a target angle (step S6). Then, the tool magazine is rotated in a direction as determined, and a tool gripping part, an angle of which is a designated target angle, is placed in the reference position 100 (step S7). Thus, the turning process of a tool magazine is finished.

Though a rotatable range of a tool magazine is set by the setting unit including the input unit 14 and the like in the above-described preferred embodiment, the tool replacement control unit may be configured to set a movable range of a tool magazine automatically when a tool is mounted on the tool magazine, instead of using the setting unit.

Figure 9:
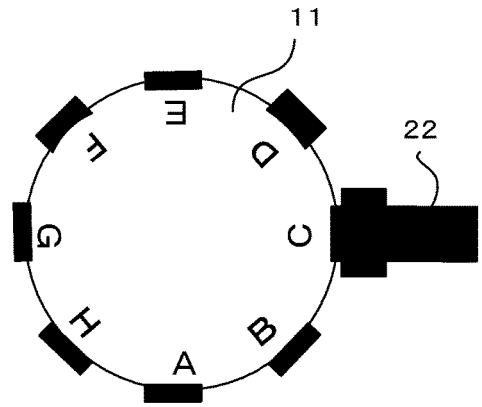
FIG. 9 is a view of an example in which data about tool lengths and data about interference ranges correspond to each other.
Figure 11:
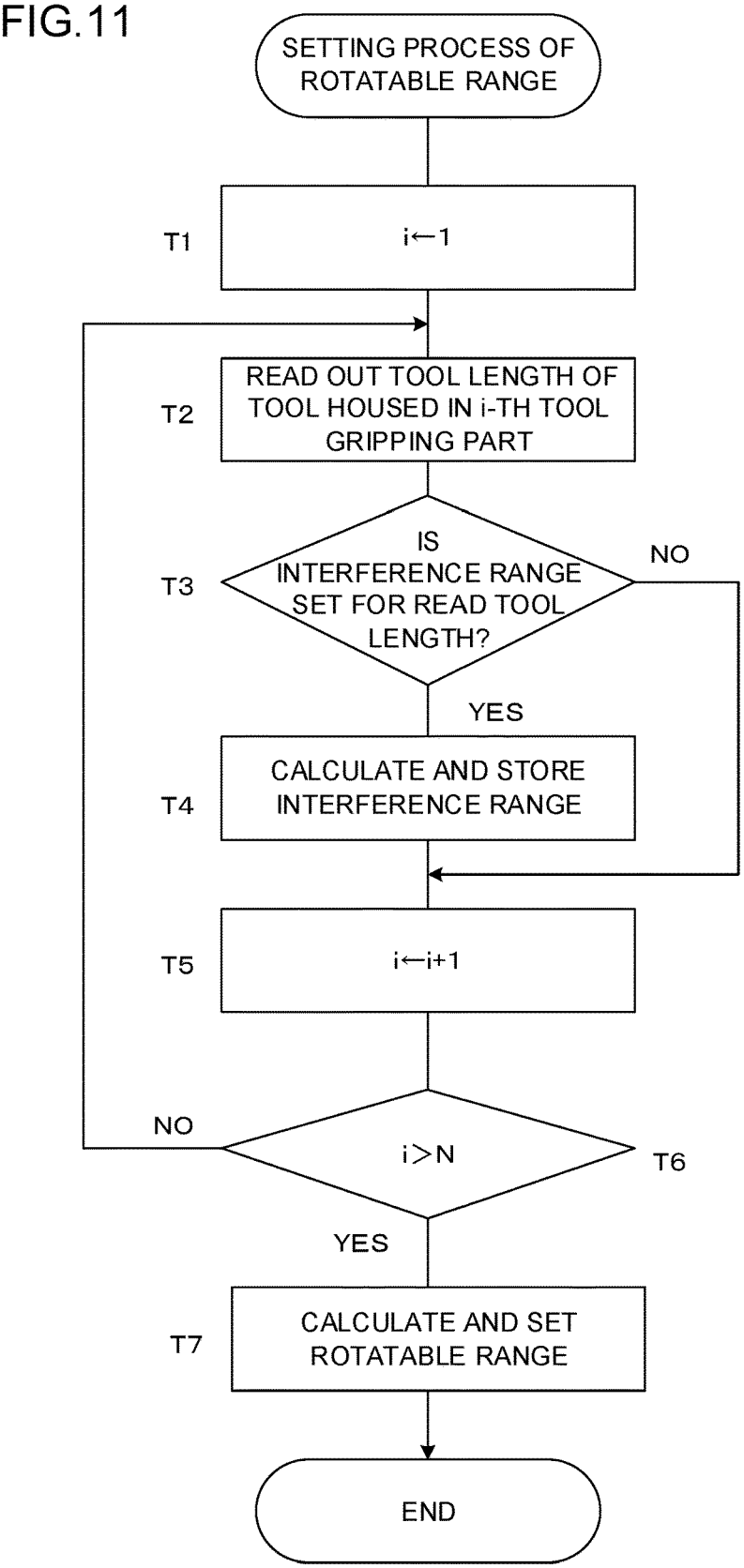
FIG. 11 is a flow chart showing an algorithm of a setting process of a rotatable range based on data about tool lengths.

In this case, the tool replacement control unit of the tool replacement apparatus previously stores data about tool lengths of tools mounted on respective tool gripping parts of a tool magazine, and data about interference regions or rotatable regions which correspond to the tool lengths (which will hereinafter be referred to as interference range data), in the memory. As shown in FIG. 9, tool lengths and interference ranges provided when tools having the respective tool lengths are attached to the tool gripping part A which is an origin of a phase of the tool magazine 11 and the tool gripping part A is placed in the reference position 100, are set and stored in the memory of the tool replacement control unit 12, in such a manner that the tool lengths and the interference ranges correspond to each other. Then, a tool is attached to the tool magazine 11 and an instruction for setting a rotatable range of the tool magazine is input by the input unit 14, so that the processor of the tool replacement control unit 12 starts to perform a process shown in FIG. 11. First, an indicator i is set at "1" (step T1), and a tool length of a tool mounted on the i-th tool gripping part is read out (step T2). Subsequently, determination is made as to whether or not an interference range corresponding to the read tool length is set, based on the interference range data stored in the memory (step T3). If no interference range is set, the process goes to a step T5. If an interference range is set, an interference range of a tool mounted on the i-th tool gripping part in the tool magazine is calculated based on the interference range data. For calculation of the interference-range data, an angle of the i-th tool gripping part is added to each of an upper limit and a lower limit of an interference range corresponding to the tool length, and is offset, so that an interference range is obtained and stored (step T4).

Then, "1" is added to the indicator i (step T5), and determination is made as to whether or not the indicator i is larger than the number N of the tool gripping units 20 of the tool magazine 11 (step T6). If the indicator i is not larger than the number N, the process returns back to the step T2, and the steps T2 to T6 are carried out. If the indicator i is larger than the number N of the tool gripping parts, determination is made as to whether or not interference range data is provided for each of tools held by all of tool gripping parts. Then, if an interference range data is provided, a corresponding interference range is calculated and stored, and thereafter, the process goes to a step T7, in which a rotatable range of the tool magazine 11 is obtained based on the interference range obtained in the step T4, and is set.

For example, in a case where interference ranges are set for tool lengths as shown in FIG. 9 and a tool having a length of 150 mm is attached to the tool gripping part C, an interference range is −160 degrees to +160 degrees (−160 to −180=+180 to +160). Because of the foregoing matter and an angle of the tool gripping part C which is 90 degrees, the interference range of the tool held by the tool gripping part C obtained by Step T4 is −70 (=−160+90) degrees to −110 (=+160+90=250) degrees. If an interference range is provided for only the tool attached to the tool gripping part C, a region excluding the obtained interference range is set as a rotatable range in the step T7. More specifically, the tool magazine 11 can be rotated to a lower limit angle of −70 degrees in a reverse direction (−direction), and can be rotated to an upper limit angle of −110 degrees in a normal direction (+direction).

Figure 10:
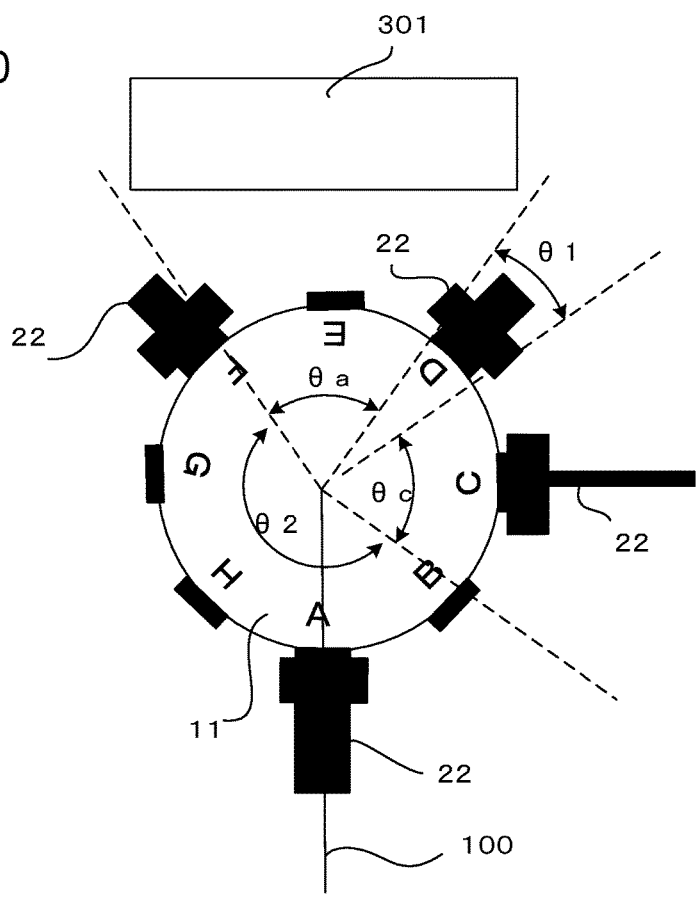
FIG. 10 is a view for explaining a rotatable range in a case where a plurality of tools which cause interference are housed in a tool magazine.

Also, as shown in FIG. 10, in a case where an interference range θa of a tool attached to the tool gripping part A in the reference position is −130 degrees to +130 degrees, and data of −160 degrees to +160 degrees is read out as an interference range θc of a tool attached to the tool gripping part C in the reference position, from stored data about an interference range corresponding to the tool length, an interference range of the tool attached to the tool gripping part A is stored as being −130 degrees to +130 degrees because an angle of the tool gripping part A is 0 degree in the step T4. Further, an interference range of the tool attached to the tool gripping part C is −70 (=−160+90) degrees to −110 (=+160+90=250) degrees because an angle of the tool gripping part C is 90 degrees. Then, those interference ranges are stored.

As a result, in the step T7, a region which excludes the above-mentioned two interference ranges, to thereby include a region θ1 (−130 degrees to −110 degrees) and a region θ2 (−70 degrees to +130 degrees) is a rotatable range, and the region θ2 (−70 degrees to +130 degrees) which is the largest region in the above-mentioned rotatable range is set as a rotatable range.

Though the tool replacement control unit is provided in the tool replacement apparatus in the above-described preferred embodiment, the tool replacement control unit may be provided within the control device (CNC) which controls a machine tool. That is, the control device (CNC) which controls a machine tool is also used as the tool replacement control unit, and an input unit and a display unit included in the control device (CNC) which controls a machine tool may be used as the input unit and the display unit. Then, the processor of the control device (CNC) which controls a machine tool may be designed so as to carry out the turning process of a tool magazine and the setting process of a rotatable range of a tool magazine. In such a case, if the control device (CNC) which controls a machine tool has a function of prefetching a processing program, determination is made as to whether or not a target rotation angle designated in an instruction for turning a tool magazine for replacement of a tool is within a rotatable range by prefetching a processing program (the step S1 in FIG. 8). Then, if a target rotation angle is out of the range, mechanical actions are temporally stopped. As a result of this, it is possible to safely avoid interference.

Also, in a case where the control device (CNC) which controls a machine tool has a function of making a program check for a processing program, determination is made as to whether or not a target angle designated in an instruction for turning a tool magazine is within a rotatable range of the tool magazine during a program check. Then, when an instruction for turning out of the rotatable range is provided, by indicating that turning cannot be achieved because of occurrence of interference, confirmation as to whether or not interference occurs can be made before a machine tool starts to carry out processing.

Though it has been described in the above-described preferred embodiment that, in turning a tool magazine, a rotatable range of the tool magazine is limited when a tool housed in the tool magazine interferes with another member, the present invention is also applicable to a case where it is required to limit a rotatable range of a tool magazine for the other purposes than a purpose of prevention of interference between a tool and another member.

The invention claimed is:

1. A tool replacement apparatus for a machine tool comprising:
    a turning tool magazine capable of attaching or removing a tool to/from a spindle of a machine tool;
    a tool replacement control unit which controls operations of turning the tool magazine and attaching or removing a tool to/from a spindle; and
    a setting unit which sets a rotatable range of the tool magazine,
    the tool replacement control unit including:
        a determining unit which determines whether or not a designated rotation angle in an instruction for turning a tool magazine is within the rotatable range set by the setting unit; and
        a unit which stops an operation of replacing a tool when the determining unit determines that a designated rotation angle is out of a rotatable range.

2. The tool replacement apparatus according to claim 1, wherein
    when the determining unit determines that a designated rotation angle is out of a rotatable range, the tool replacement control unit outputs an instruction for temporally stopping an operation of the machine tool, to a control device which controls the machine tool.

3. The tool replacement apparatus according to claim 1, wherein
    the rotatable range of a tool magazine which is set by the setting unit is set as an upper limit angle to which a tool magazine is rotated in a normal direction and a lower limit angle to which a tool magazine is rotated in a reverse direction,
    the determining unit also determines a turnable direction, and
    the tool replacement control unit rotates the tool magazine in the turnable direction which is determined by the determining unit, and turns the tool magazine to a designated rotation angle which is designated in an instruction for turning a tool magazine.

4. The tool replacement apparatus according to claim 1, wherein
    the tool replacement control unit and the setting unit are provided in the control device which controls a machine tool.

5. The tool replacement apparatus according to claim 4, wherein
    the control device which controls a machine tool prefetches a processing program of a machine tool,
    the determining unit determines whether or not a designated rotation angle is within a rotatable range based on an instruction for turning a tool magazine which is obtained by prefetching, and
    an instruction for temporally stopping an operation of the machine tool is output to the control device which controls a machine tool when it is determined that a designated rotation angle is out of a rotatable range.

6. The tool replacement apparatus according to claim 4, wherein
    the control device which controls a machine tool includes a program checking unit which checks a processing program,
    the determining unit determines whether or not a designated rotation angle in an instruction for turning a tool magazine is within a rotatable range while the program checking unit is making a program check, and
    a display unit of the control device which controls a machine tool indicates that an instruction for turning out of a rotatable range is provided when it is determined that a designated rotation angle is out of a rotatable range.

7. A tool replacement apparatus for a machine tool comprising:
    a turning tool magazine capable of attaching or removing a tool to/from a spindle of a machine tool; and
    a tool replacement control unit which controls operations of turning the tool magazine and attaching or removing a tool to/from a spindle, wherein the tool replacement control unit includes:
    a data storing unit which stores data about an interference region or a rotatable range of a tool magazine which corresponds to data about a tool length of a tool;
    a unit which calculates and sets a rotatable range of a tool magazine from a tool length of a tool attached to a tool magazine, based on data stored in the data storing unit; and
    a unit which stops an operation of replacing a tool when a determining unit determines that a designated rotation angle is out of the rotatable range.

8. The tool replacement apparatus according to claim 1, further comprising
    a display unit, wherein
    when the determining unit determines that a designated rotation angle is out of a rotatable range, the tool replacement control unit informs a user accordingly with the use of the display unit.

* * * * *